(12) United States Patent
Flammer, III et al.

(10) Patent No.: US 6,298,053 B1
(45) Date of Patent: Oct. 2, 2001

(54) METHOD AND APPARATUS FOR CONNECTION HANDOFF BETWEEN CONNECTED RADIOS

(75) Inventors: George H. Flammer, III, Cupertino; David Lynn Paulsen, Mountain View, both of CA (US)

(73) Assignee: Metricom, Inc., San Jose, CA (US)

( * ) Notice: Subject to any disclaimer, the term of this patent is extended or adjusted under 35 U.S.C. 154(b) by 0 days.

(21) Appl. No.: 09/483,304

(22) Filed: Jan. 14, 2000

(51) Int. Cl.$^7$ ........................................................ H04J 3/24
(52) U.S. Cl. .................................................................. 370/349
(58) Field of Search ........................................ 370/349, 277, 370/280, 294, 310, 327, 328, 329, 331, 330, 334, 336, 337, 338, 339, 340, 341, 345, 347, 353, 356, 360, 396, 400, 401, 404, 406, 442, 445, 449; 375/130, 132, 138; 455/436, 439, 448

(56) References Cited

U.S. PATENT DOCUMENTS

| | | |
|---|---|---|
| 5,371,780 | 12/1994 | Amitay .................................... 379/58 |
| 5,471,469 | 11/1995 | Flammer, III et al. ............... 320/346 |
| 5,488,608 | 1/1996 | Flammer, III .................... 370/853.13 |
| 5,530,693 | 6/1996 | Averbuch et al. ...................... 370/60 |
| 5,673,031 | * 9/1997 | Meier .................................... 370/346 |
| 6,085,076 | * 7/2000 | Lindsay et al. ................. 340/825.08 |
| 6,110,103 | * 12/2000 | Anderson et al. .................... 455/435 |

* cited by examiner

Primary Examiner—Douglas Olms
Assistant Examiner—Phirin Sam
(74) Attorney, Agent, or Firm—Townsend and Townsend and Crew LLP

(57) ABSTRACT

In a radio based wireless mesh packet network wherein packet traffic is scheduled between a high capacity communications link and a plurality of nodes interconnected by wireless links, an access unit is provided at a first node having a plurality of radios coupled to the high capacity link and wherein each of the plurality of radios is capable of detecting a polling of the access unit by other nodes. A poll is sent from a second node to the access unit at the first node on a first channel. Reports of receipt of the poll are shared among the plurality of radios. An acknowledgment is sent on behalf of the access unit from only one of the plurality of radios to the polling node, and further communication is conducted between the one of the plurality of radios and the node on a second channel.

13 Claims, 2 Drawing Sheets

METHOD AND APPARATUS FOR CONNECTION HANDOFF BETWEEN CONNECTED RADIOS

BACKGROUND OF THE INVENTION

This invention relates to packet communications in a radio-based mesh communications network. In particular, the present invention is an optimization of the apparatus utilized at nodes that link the mesh radio network with a relatively high capacity communication link.

Packet communications is a form of data communication whereby segments or packets of data are routed with error checking and confirmation of receipt. Packets may be transmitted directly between a source node and a destination node or may be relayed via a number of relay nodes. Several methods of data packet routing are known.

A radio-based mesh network comprises radio nodes interconnected by a mesh of radio links. Collectively, the nodes collect, route, and deliver data packets. U.S. Pat. No. 5,488,608, teaches a method of routing packets in a heavily interconnected mesh network. According to the method described therein, each node in a network is uniquely identified by an absolute coordinate-based address, and packet routing decisions are made at each node. When a node receives a packet, the node chooses a desired forwarding route by examining the ultimate destination coordinates of the packet and the node coordinates of its neighboring nodes. The node then sends a poll to the most advantageous neighboring node to determine if it is available to receive the packet. When the node has determined that a neighboring node is available, the node forwards the packet to the selected neighboring node. Finally, the node stores the packet's destination address and the selected neighboring node's address in a routing table. The routing table provides a quick and efficient means for choosing a forwarding node the next time the node receives a packet bound for the same destination.

In a mesh network, access points are included at which the radio-based network interfaces with a relatively high speed communications link, such as a wireline. These access points permit packet communication between the mesh network and other networks linked by the wireline. Additionally, packets bound for a distant portion of the mesh network are generally routed over the wireline because the wired link provides much higher speed and capacity than the radio-based mesh network and therefore increases the overall performance of the network. Thus, the network generally seeks to route packets to an access point as soon as possible. These access points must provide a higher capacity than other nodes in the network in order to prevent bottlenecking.

In previous embodiments of radio-based mesh packet networks, a wire access point (WAP) comprises a plurality of radios that permit simultaneous access to a wireline by a plurality of nodes. Additionally, the plurality of WAP radios provide a plurality of alternate routes to and from the wireline. Nodes (clients) seeking to transmit a packet to a WAP maintain a local routing list of the WAP radios as possible recipients of the data packet. When a client wishes to transmit a packet to the WAP, the client polls the WAP radios on its routing list and sends the data packet payload to one of the WAP radios that responds. The other WAP radios remain free to service other clients.

While prior art WAPs with multiple radios provide relatively high capacity for access to the wired backbone, they exhibit several drawbacks. First, because each WAP radio must be separately polled, a relatively high number of polls is directed at the WAP. This results in increased destructive packet collisions, especially when traffic to the WAP is heavy. These destructive packet collisions cause increased latency at times of heavy traffic when greater throughput is needed. Second, employing multiple radios in the WAP decreases overall efficiency. For instance, clients that access the WAP must create and maintain a routing list of the multiple WAP radios. Also, clients must send multiple polls and process multiple poll responses before data exchange with the WAP can occur.

Methods are known in the prior art for optimizing the allocation of resources among a plurality of clients. For example, U.S. Pat. No. 5,371,780 teaches a method and apparatus for allocating cellular resources among multiple clients by assigning priorities to the clients and then iteratively allocating available resources to the highest priority clients. U.S. Pat. No. 5,530,693 teaches a method and apparatus for handing off a client in the middle of the transmission of a data packet from a first cell site to a second cell site. If the first cell has already transmitted a portion of the packet to the client, the client notifies the second cell and the second cell then transmits only that portion of the packet that the client has not yet received. This eliminates the need to resend the entire packet.

However, the prior art does not address the problems caused by and associated with the polling of a plurality of radios at an access point.

SUMMARY OF THE INVENTION

According to the invention, in a radio based wireless mesh packet network wherein packet traffic is scheduled between a high capacity communications link and a plurality of nodes interconnected by wireless links, an access unit at a first node is provided having a plurality of radios coupled to the high capacity link and wherein each of the plurality of radios is capable of detecting a polling of the first node by other nodes. A poll is sent from a second node to the access unit at the first node on a first channel, such as a specific frequency hopping sequence, and then reports of receipt of the poll are shared among the plurality of radios. An acknowledgment is sent on behalf of the first node from only one of the plurality of radios to the second node, and further communication is conducted between the one of the plurality of radios at the first node and the second node on a second channel, or second specific frequency hopping sequence.

An access unit according to the invention is different from prior art access units in that the present access unit appears to the other nodes as having only one radio. A node seeking to send a packet to the access unit sends only one poll and receives only one response to the poll. As a result, the capacity of the access unit is increased because destructive packet collisions are minimized by reducing the number of polls required. Also, the overall efficiency of the network is increased by reducing the overhead of nodes seeking to transmit to the access unit Reference is made to the following detailed description and accompanying drawings.

DESCRIPTION OF SPECIFIC EMBODIMENTS

Figure 1:
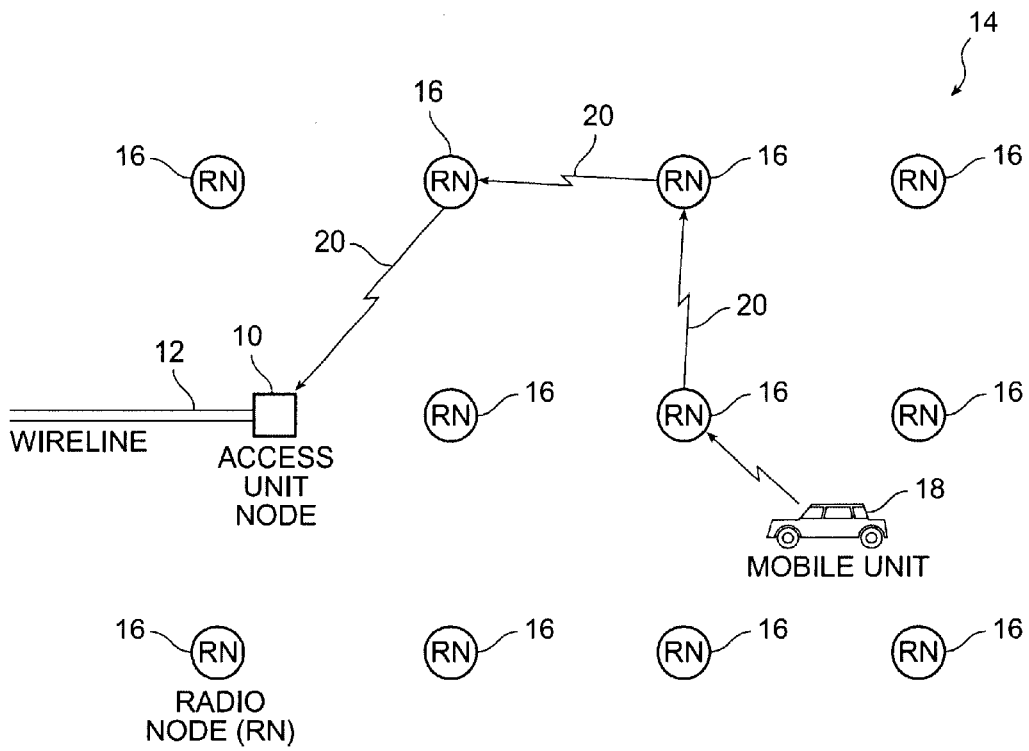
FIG. 1 is a schematic diagram of a mesh network in which the apparatus would operate.

FIG. 1 illustrates a radio-based mesh network 14. The mesh network 14 comprises a plurality of radio nodes 16 including at least one node serving as a wire access unit 10 for interfacing the mesh network 14 with a high speed wireline backbone 12. Each of the nodes 16 is capable of receiving, routing, and transmitting a data packet, for example, as disclosed in U.S. Pat. No. 5,488,608. A mobile unit 18 within the mesh network 14 may transmit and receive data packets via the mesh network 14. When the mobile unit 18 transmits a packet, the mesh network 14 routes the packet along a path 20 among the radio nodes 16 to the access unit node 10.

Figure 2:
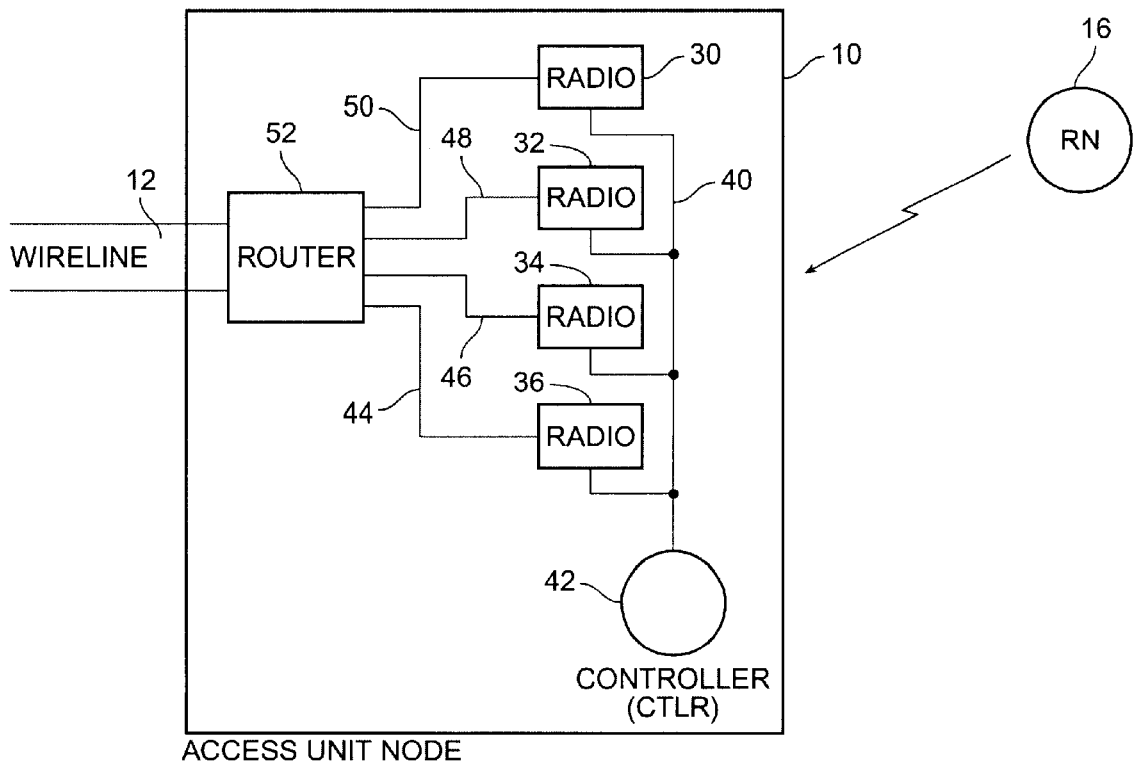
FIG. 2 is a block diagram of an access unit showing the functional elements of the invention.

FIG. 2 illustrates a function structure of the access unit node 10 according to the present invention. The access unit node 10 comprises a plurality of radios 30, 32, 34, and 36 that are in communication with a controller 42 via a high speed, private link 40, such as an ethernet link. The radios 30, 32, 34, and 36 are additionally in communication with the high speed wireline 12 via connections 44, 46, 48, and 50, and router 52. A data packet received by any of the radios 30, 32, 34, or 36 is first sent to the router 52, which then sends the packet over the high speed wireline 12. Similarly, packets received over the wireline 12 are routed via the router 12 to one of the radios 30, 32, 34, or 36, which transmits the packet into the mesh network 14. The plurality of radios 30, 32, 34, and 36 are heavily interconnected via radio links with the nodes 16, and provide the mesh network 14 with multiple routing options for data packets going to or coming from the wired backbone 12 via the access unit node 10.

In order for a remote node 16 to transmit a packet to the access unit node 10, the remote node 16 must first establish communications with a radio in the access unit node 10. (In the prior art, such a remote node 16 would separately send a poll to each of the individual radios in the access unit node 10, and then establish communications with one of the radios that responded.) In the present invention, the remote node 16 need send only one poll. All radios 30, 32, 34, and 36 are capable of being polled on a poll solicitation channel comprising for example a specific frequency hop sequence. Any of the radios 30, 32, 34, and 36 that are not busy wait for polls on the poll solicitation channel by hopping in synchronization with the poll solicitation frequency hop sequence.

When any of the radios 30, 32, 34, and 36 receive a poll, they communicate that receipt to the controller 42. If only one of the radios 30, 32, 34, and 36 has received the poll, for example the radio 32, then the controller 42 instructs the radio 32 to conduct further communications with the polling node 16. The radio 32 then sends an acknowledgment to the polling node 16 on behalf of the access unit 10 and receives the packet from the node 16 on a channel separate from the poll solicitation channel. If more than one of the radios 30, 32, 34, and 36 received the poll and report it to the controller 42, for example, all four of the radios 30, 32, 34, and 36, then the controller 42 chooses only one of the radios 30, 32, 34, and 36 to conduct further communications with the polling node. The radio chosen by the controller 42 then sends an acknowledgment on behalf of the access unit node 10 to the polling node 16 and receives further packets from the polling node 16 on a channel separate from the poll solicitation channel. In the present embodiment, the controller 42 selects a radio to respond by choosing the radio that historically has communicated most successfully with the polling node.

Figure 3:
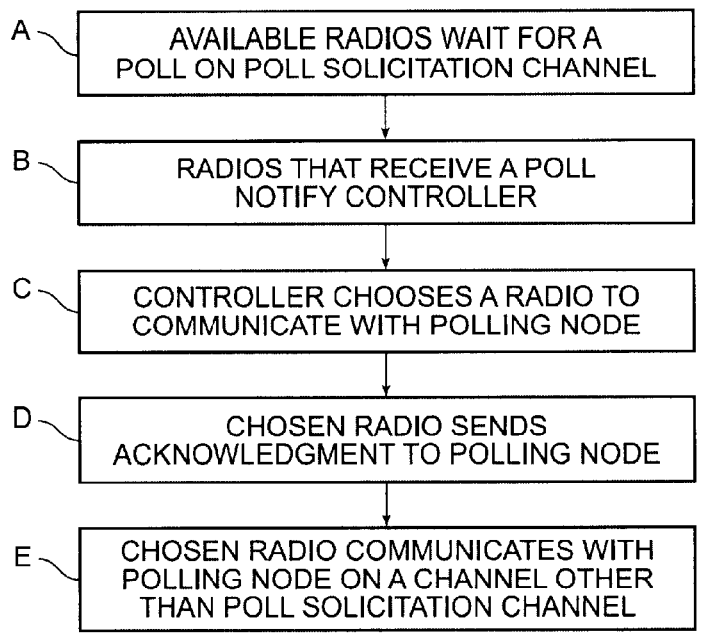
FIG. 3 is a flow chart of a method according to the invention.

FIG. 3 illustrates a flow chart of the method employed by the apparatus illustrated in FIG. 2. First, radios in the access unit node 10 that are available, e.g. are not currently communicating with a node 16, wait for a poll on the poll solicitation channel (Step A). When a poll is received by one or more radios, the receiving radios notify the controller 42 of the receipt (Step B). Then, the controller 42 chooses from among the radios that received the poll only one radio to further communicate with the polling node 16 (Step C). The chosen radio sends an acknowledgment on behalf of the access unit 10 to the polling node 16 (Step D). Finally, the chosen radio communicates with the node 16 on a channel other than the poll solicitation channel (Step E).

Figure 4:
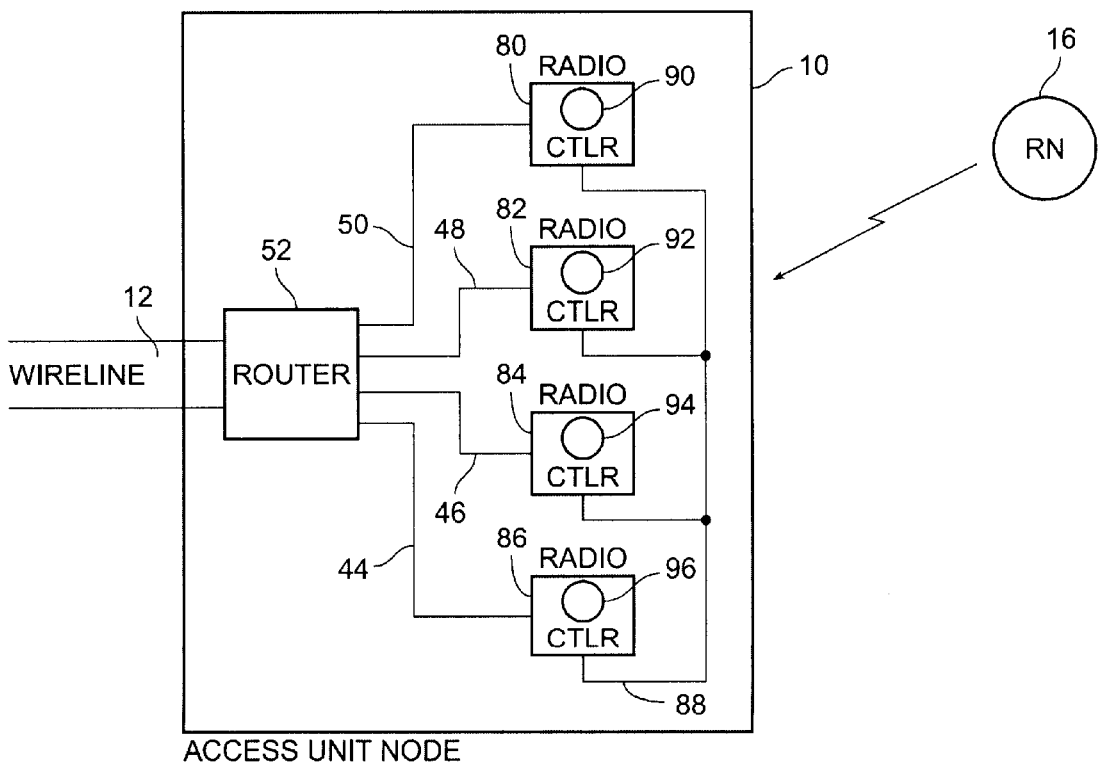
FIG. 4 is a block diagram of a second embodiment of the invention.

FIG. 4 illustrates a second embodiment of the present invention in which the control function is distributed among the radio units. The access unit node 10 comprises a plurality of radio units 80, 82, 84, and 86 that are in communication with each other via a private link 88 such as an ethernet link. The radio units 80, 82, 84, and 86 each include internal controllers 90, 92, 94, 96, respectively. The radios 80, 82, 84, and 86 are also in communication with the high speed wireline 12 via connections 44, 46, 48, and 50 via router 52.

The controllers 90, 92, 94, and 96 are effectively a distributed version of the controller 42 of the previous embodiment. Thus, when a poll is received by any of the radios 80, 82, 84, and 86, the respective controllers 90, 92, 94, and 96 communicate the receipt to the other controllers. Then, the controllers 90, 92, 94, and 96 choose which of the radios 80, 82, 84, and 86 to respond to the poll. For example, if radios 80 and 82 receive a poll, the controllers 90 and 92 communicate the receipt to each other as well as controllers 94 and 96. Then, the controllers 90, 92, 94, and 96 choose among themselves which one of the radios 80, 82, 84, and 86 is to respond to the poll. As in the previous embodiment, the chosen radio then sends an acknowledgment on behalf of the access unit node 10 to the polling node 16, and receives the packet from the node 16 on a channel separate from the poll solicitation channel.

Thus, in the present invention, the access unit node 10 appears to the nodes 16 as being only one radio, even though the access unit node 10 comprises multiple radios. The present invention thereby increases the efficiency, capacity, and performance of a mesh network in which the invention operates. Efficiency is increased because the nodes 16 see only one WAP radio target in their scan list and therefore send only one poll instead of multiple polls. The nodes 16 use less resources searching their scan lists and sending polls. Additionally, the present invention increases capacity. Because the nodes 16 transmit less polls overall to the WAP, less collisions occur and more polls get through to the WAP. Thus, transmissions that would be lost due to interference in a prior art WAP are identified and used with the present invention. Moreover, the present invention increases performance for several reasons. First, the nodes' scan lists are markedly shorter, resulting in shorter contention intervals for clients. Second, when fewer transmissions are sent in vain, interference caused by those vain transmissions drops and local poll success percentages increase. Third, unutilized transmission opportunities are reduced, resulting in an increase in capacity.

A number of modifications to this apparatus and method will be obvious to one of ordinary skill in the art. For example, although the present embodiments show four radios in the access unit, more or less radios may be employed. Also, the access unit may connect to any suitable high speed, high capacity link, such as a microwave link. Additionally, the private ethernet link may be any other suitable private link. Furthermore, although the present embodiments disclose using a frequency hop sequence for the poll solicitation channel, other types of channels may be used, such as a dedicated frequency channel or a time slot in a time-multiplexed system. And, the controller may utilize various methods for selecting the radio to respond, for example, by lottery, by a fixed sequence, by random selection, or by some algorithmic optimization.

The invention has now been explained with reference to specific embodiments. Other embodiments will be apparent to those of ordinary skill in the art. Therefore it is not intended that this invention be limited except as indicated by the appended claims.

What is claimed is:

1. A method in a radio based wireless mesh packet network for optimizing packet traffic scheduling between a high capacity communications link and a plurality of nodes interconnected by wireless links, the method comprising:

providing at a first node an access unit having a plurality of radios coupled to said high capacity link wherein each of said plurality of radios is capable of detecting a polling of said first node;

sending a poll from a second node to said first node on a first channel;

sharing among said plurality of radios reports of receipt of said poll;

sending an acknowledgment on behalf of said first node from only one of said plurality of radios to said second node; and conducting further communication between said one of said plurality of radios and said second node on a second channel.

2. The method according to claim 1 wherein said plurality of radios are co-located and are interconnected by a private link.

3. The method according to claim 2 wherein said first channel is a first frequency hop sequence.

4. The method according to claim 1 wherein said sharing step includes sending said reports to a controller.

5. The method according to claim 4 wherein said one of said plurality of radios is chosen by said controller.

6. The method according to claim 5 wherein said plurality of radios are co-located and are interconnected by a private link.

7. The method according to claim 6 wherein said first channel is a first frequency hop sequence.

8. An apparatus in a radio based wireless mesh network for optimizing packet traffic scheduling between a high capacity communications link and a plurality of nodes, the apparatus comprising:

a plurality of radios at a first node coupled to said high capacity link wherein each of said plurality of radios is capable of detecting a polling of said apparatus by a second node on a first channel; and a controller connected to each of said plurality of radios allowing only one of said plurality of radios to respond to said polling by said second node, and causing said responding radio to communicate with said second node on a second channel.

9. The apparatus as in claim 8 wherein said first channel is a first frequency hop sequence.

10. The apparatus as in claim 9 wherein said plurality of radios are interconnected via a private communication link.

11. The apparatus as in claim 8 wherein said controller is distributed among said plurality of radios.

12. The apparatus as in claim 11 wherein said first channel is a first frequency hop sequence.

13. The apparatus as in claim 12 wherein said controller is distributed among said plurality of radios.

* * * * *